United States Patent

Schachenmann et al.

[11] Patent Number: 5,873,935
[45] Date of Patent: Feb. 23, 1999

[54] COATING COLOR

[75] Inventors: Max Schachenmann, Oftringen; Dieter Strauch, Zofingen, both of Switzerland

[73] Assignee: Pluss-Staufer AG, Oftringen, Switzerland

[21] Appl. No.: 813,741

[22] Filed: Mar. 7, 1997

[30] Foreign Application Priority Data

Mar. 13, 1996 [DE] Germany .......................... 19609868.8

[51] Int. Cl.⁶ .............................. B01J 13/00; C08K 3/26; C09C 1/00
[52] U.S. Cl. .......................... 106/465; 106/463; 106/464; 252/313.1; 252/314; 524/427
[58] Field of Search ................................ 252/313.1, 314; 106/31.65, 463, 464, 465; 524/427

[56] References Cited

U.S. PATENT DOCUMENTS

| | | | |
|---|---|---|---|
| 2,346,243 | 4/1944 | Wilson | 106/465 |
| 3,006,779 | 10/1961 | Leaf et al. | 106/464 X |
| 3,118,782 | 1/1964 | Hoge et al. | 106/464 X |
| 3,322,683 | 5/1967 | Lester | 252/313.1 |
| 3,597,251 | 8/1971 | Kaufman | 106/464 X |
| 3,989,195 | 11/1976 | Falcon-Steward | 106/464 X |
| 4,159,312 | 6/1979 | Shibazaki et al. | 106/464 X |
| 4,279,661 | 7/1981 | Strauch et al. | 106/464 |
| 4,509,987 | 4/1985 | Farrar et al. | 106/465 X |
| 5,120,365 | 6/1992 | Kogler | 106/463 X |

*Primary Examiner*—Richard D. Lovering
*Attorney, Agent, or Firm*—Townsend and Townsend and Crew LLP

[57] ABSTRACT

A coating color comprising 28–51% by weight of water, 43–64% by weight of carbonate-containing pigment with a specific particle distribution and a particle diameter of 0.18–0.28 $\mu$m and a specific surface area of 19–26 M²/g and 6–8% by weight of conventional binding agents and additives may be employed with advantage for coated papers. The coating color is produced by wet milling of the carbonate-containing pigment without the addition of dispersing or wetting agents at a solids concentration of 30–20% by weight in an agitating ball mill, subsequent concentration, re-dispersal and the addition of binding agents, water and additives.

16 Claims, No Drawings ically insoluble in the medium which they are employed in. Many inorganic
COATING COLOR The invention relates to a coating color comprising water, carbonate-containing pigments, more particularly $CaCO_3$ pigment together with customary binding agents and additives.

BACKGROUND OF THE INVENTION

Pigments are inorganic or organic, chromatic or non-chromatic coloring materials which are practpigments also function as fillers or vice versa. Pigments are more especially employed for coloring lacquers and paints, for coloring plastics, paper, textiles, cement, concrete, ceramics, glass, enamels, cosmetics, foodstuffs and furthermore for inks in the printing industry and as artists' coloring materials.

It is more particularly in the paper making industry that products are demanded which possess a high gloss. The German patent 2,733,722 relates to a method for the continuous production of calcium sulfo-aluminate pigment with a particle size of 0.1 to 2.0 µm by the reaction of calcium hydroxide with aluminum sulfate for paper coating purposes. As applied to paper for printing purposes and the like this method leads to a high gloss even in the case of only moderate calendering conditions owing to the high degree of hydration of sateen white, paper with a high opacity being obtained by the formation of a thick coating layer.

The German patent 1,938,162 relates to a method for the coating of paper or the like, wherein a coating material in the form of a polymeric composition comprised in a liquid medium is applied to the web. The use of this method is to render possible the direct production of a light coating with a high degree of smoothness and opacity without subsequent smoothing operations being necessary.

The German patent 3,617,169, however, discloses that when employed as the sole pigments carbonate-containing pigments, more particularly $CaCO_3$ pigments, produce substantial technical advantages. The present invention accordingly relates to a coating color which as pigments exclusively contains carbonate-containing pigments.

It is furthermore known that carbonate-containing pigments which have a high specific surface area may be advantageously employed as pigments for high gloss paper. Thus the German patent 4,400,566 discloses a method for the production of natural and/or synthetic carbonates, more especially calcium carbonates, which possess a specific surface area of over 20 m²/g as determined by the BET/$N_2$ method and preferably 20 to 50 m²/g using the same method. Such carbonate-containing pigments are produced by wet grinding milling with recirculation, that is to say with feedback of the product leaving the mill so many times that the final product is produced with the desired specific surface area.

It has been known for a long time that the gloss of a paper is dependent on the grain size distribution of the pigment contained therein.

Pigments must generally be milled in order to render them suitable for the various different fields of application. This will now be explained in the following example in detail with reference to a paper coating composition. Coated papers are coated with a composition essentially containing an adhesive or binding agent and a pigment in the form of a mineral filler. For a description of the components of paper coating materials and the application thereof, see the book by James P. Casey, "Pulp and Paper Chemistry and Technology," chapter XIX, vol. III (1961). The binding agent employed may consist of for example starch, casein or a synthetic latex. The specific binding agent employed will for example be dependent on the printing process used; thus offset litho printing requires a binding agent which is insoluble in water.

One group of calcium carbonate pigments consists a naturally occurring material. Such a material includes limestone, marble and chalk.

The normally commercially available natural prepared chalk pigments incline to form low-gloss paper coatings. This is to be attributed to the fact that none of them contain more than 35% by weight of particles under 2 microns.

Taking this as a starting point the German patent publication 1,696,190 B proposes a paper coating composition for glossy coated paper, which is characterized in that natural chalk is worked to such an extent by milling with sand or in a jet mill or by particle size-based classification that it contains at least 60% by weight of particles under an equivalent spherical diameter of 2 microns, and does not contain more than 5% by weight of particles larger than an equivalent spherical diameter of 10 microns, and not more than 0.05% by weight of particles which are larger than 53 microns in size.

Speaking quite generally it is to be observed that the particle size has an substantial influence on the properties of the product containing the filler, as for example on the gloss of a coated paper. The German patent 2,808,425 lists 9 literature references from which it appears that gloss increases with an increase in the proportion in the pigment of the finest particles. This means that at the time it was assumed that as regards gloss there was no optimum level for the content of finest particles of the pigment, for the opinion was that the finer the particles of the pigment, the higher the gloss.

The teaching of the said German patent 2,808,425 was the recognition that this previous teaching was superseded, for in accordance with the said German patent 2,808,425 a still higher gloss could be obtained if ultra-fine particles, i.e. particles <0.2 µm, were completely or substantially avoided. This meant that there is in fact an optimum as regards gloss, namely as regards the value for particles <0.2 µm.

Finally in connection with the prior art it is to be observed that the gloss of coated paper increases with each increase in the solids content of the coating color.

SUMMARY OF THE INVENTION

One object of the present invention is to create a coating color of the sort noted initially, which in the case of application in papers leads to a higher gloss than is the case with prior art products.

In order to achieve this aim in the invention the coating color consists of 28–51% by weight of water, 43–64% by weight of carbonate-containing pigment with a particle size distribution of 100% <2 µm
94–100% <1 µm
75–94% <0.5 µm
31–59% <0.2 µm a mean statistical particle diameter ($D_{50}$) of 0.18–0.28 µm and a specific surface area of 19–26 m²/g and furthermore 6–8% by weight of customary binding agents and additives.

DETAILED DESCRIPTION OF THE INVENTION AND PREFERRED EMBODIMENTS

As will appear from the following comparative examples, it is extremely surprising that the coating color of the invention leads to such excellent gloss characteristics, although the solids content of the coating color only amounts to 43–64% by weight, that is to say is comparatively very low. As explained supra, a substantially poorer gloss would have been expected owing to the low solids content.

Moreover, in connection with the above described prior art it is to be noted that it is necessary for the carbonate-containing pigment to comprise not less than 31–59% of particles <0.2 µm equivalent spherical diameter. Departing from the teaching of the said German patent 2,808,425, it has been found in the invention that optimum gloss cannot be attained by just completely or substantially avoiding <0.2 µm particles and that, unexpectedly, excellent gloss can be produced at a 31–59% content of particles under 0.2 µm.

In the combination of the features in accordance with the invention the specific surface area also plays a significant role, it having to amount to from 19 to 26 m²/g.

Preferably, the coating color consists of 29–49% by weight of water and 45–63% by weight of carbonate-containing pigment and 6–8% by weight of customary binding agents and additives, more particularly 31–48% by weight of water and 45–62% by weight of carbonate-containing pigment and 7% by weight of conventional binding agents and additives.

Preferably the carbonate-containing pigment has a particle size distribution of:
100% <2 µm
95–99% <1 µm
80–91% <0.5 µm
35–51% <0.2 µm, and preferably of
38–51% <0.2 µm.

More preferably, the carbonate-containing pigment has a particle size distribution as follows:
100% <2 µm
96–98% <1 µm
77–89% <0.5 µm
40–47% <0.2 µm The carbonate-containing pigments preferably possess a mean statistical particle diameter ($D_{50}$) of 0.20–0.28 µm, and more especially 0.22–0.27 µm.

Preferably the carbonate-containing pigments have a specific surface area of 20 to 25 m²/g, more preferably 21 to 24 m²/g.

All the fineness features mentioned in the present patent application of the products manufactured in accordance with the invention were measured by sedimentation analysis in a gravitational field using a 5100 SEDIGRAPH instrument of the Micromeritics Instrument Company, Norcross, Ga., U.S.A. This instrument is known to the average man in the art and is employed world-wide for the measurement of fineness of fillers and pigments.

The specific surface area was measured in accordance with BET as scheduled in the German Industrial Standard (DIN) 66,131. The sample, previously dried to constant weight at 105° C., was heated in a thermostatically controlled, nitrogen flushed oven for one hour at 250° C. Measurement took place with nitrogen ($N_2$) as a measuring gas using liquid nitrogen cooling.

Herein "solids concentration" means the content of abs. dry carbonate-containing pigment, more particularly calcium carbonate in aqueous suspension, expressed in percent by weight.

The conventional binding agents and additives to be employed in the invention are well known to every average man in the art and no inventive effort is required to select suitable binding agents and additives. Merely to give an example, the following binding agents and additives may be more especially employed:
Binding agents (acrylic esters, acrylonitrile, styrene, copolymer)
Thickeners (urea-formaldehyde condensation product)
Natural CO-binder (carboxylmethylcellulose).

PRODUCTION OF THE COATING COLOR OF THE INVENTION

The coating color in accordance with the invention is produced in accordance with the invention by wet milling down of the carbonate-containing pigment, without the addition of dispersing or wetting agents at a solids concentrate of 30–20, and preferably 26–21% by weight in an agitating ball mill with recirculation until a final fineness of 100% of particles <2 µm, 94–100% of particles <1 µm, 75–94% of particles <0.5 µm and 31–59% of particles <0.2 µm, a mean statistical particle diameter ($D_{50}$) of 0.18–0.28 and a specific surface area of 19–26 m²/g is reached.

The carbonate-containing pigment suspension produced in this manner is then concentrated to a solids content of 63–65% by weight and re-dispersed in a known manner with a conventional, commercially available dispersing agent. Finally the coating color is so mixed by the addition of conventional, commercially available binding agents, of water and conventional, commercially available additives that the parameters specified in claim 1 are complied with.

WORKING EMBODIMENT

Natural calcium carbonate was premilled in a conventional fashion while dry. Fine milling was performed while wet without the addition of dispersing and wetting agents, in an agitating ball mill at a solids concentration of 26–21% by weight. Milling was continued with recirculation until the desired final degree of fineness was detected by means of sedimentation analysis.

PARAMETERS FOR WET MILLING, WITHOUT DISPERSING AGENTS

Agitating ball mill: manufactured by Drais, 12-liter capacity

Speed of rotation of agitating disk: 10 m/s

Solids content: 26–21% by, reduction by addition of water from 26 to 21%

Size of charge: $CaCO_3$—marble, 9 kg abs. dry

Manner of operation: with recirculation (agitation vessel to pump to mill to agitation vessel)

Measurement of specific surface area was then performed employing the said BET method.

EP 4 (experimental product 4)=the $CaCO_3$ product in accordance with the invention was produced by wet milling without the addition of dispersing or wetting agents in agitating ball mill in a recirculation mode at a solids content of 21% by weight. Using a filter press and subsequently microwave drying the product was concentrated to approximately 65% solids content. The filter cake obtained was re-dispersed in an anionic dispersant (a copolymer of acrylic acid and maleic anhydride) with a fraction of 1.0 abs. dry at 62% using a dissolver.

The product in accordance with the invention (EP 4) so produced had a final fineness of 100% <2 µm, 96% <1 µm, 83% <0.5 µm and 41% of particles <0.2 µm a specific surface area of 22.7 m²/g and a mean statistical particle diameter ($D_{50}$) of 0.24 µm.

PRODUCTION OF CONTROL PRODUCTS:

For testing in a paper coating color for web-feed offset litho printing control and commercial products were produced with maximum similarity of specific surface areas and tested together.

EP 1 was a natural calcium carbonate in the form of a leading product available in the art with a degree of fineness of 91% <1 $\mu$m and 64% <0.5 $\mu$m and furthermore a specific surface area of 21.8 m$^2$/g. This product was produced by wet milling in an agitating ball mill with the addition of anionic dispersant (a copolymer of acrylic acid and maleic anhydride) in a cascade manner of operation and with a high solids content of 75% by weight.

EP 2 was a commercially available kaolin in the form of a leading product with 98% <1 $\mu$m and 90% <0.5 $\mu$m and a specific surface area of 21 m$^2$/g. This spray dried product can be directly added to the coating color formulation.

EP 3 was a CaCO$_3$ test product obtained by wet classification with a degree of fineness of 98% <1 $\mu$m, 85% <0.5 $\mu$m and furthermore a specific surface area of 22.5 m$^2$/g. This product had almost the same fineness parameters as EP 4. This experimental product was produced from a CaCO$_3$ standard slurry with 90% <2 $\mu$m, mixed with an anionic dispersant, by separating the maximum fineness fraction by wet classification. This fine fraction was then concentrated by a filter press to a solids content of 63% by weight and used. For re-dispersal 0.8% by weight of the same anionic dispersant (a copolymer of acrylic acid and maleic anhydride) was added to the said product.

EXAMPLE

A coating color formulation for web-feed offset litho printing.

| | |
|---|---|
| Binding agent (acrylate, styrene, acrylonitrire) | 6.8% abs. dry |
| Thickener (urea-formaldehyde condensation product) | 0.24% abs. dry |
| Natural CO binding agent (carboxylmethylcellulose) | 0.5% abs. dry |
| Coating pigment, e.g. CaCO$_3$ | 48.5% abs. dry |
| Solids content was set to | 56% |
| Coating conditions | Lab coating machine, customized design |
| Raw paper | 36–37 g/m$^2$, wood-free |
| Application rate | Top side 7.7 g/m$^2$, screen side 8 g/m$^2$ |
| Coating unit | Blade coater, working speed 30 m/min. |
| Drying | Infrared heating |
| Glazing | Kleinewefers Laboratory twin roll calender 90 daN/cm line pressure at 90° C. roll temperature |

Testing Conditions:

| | |
|---|---|
| Gloss lab | T 480, TAPPI method, entry and exit jet angle 75° |
| Print gloss | Measurement of gloss was also performed in accordance with TAPPI 750 specification for entry and exit angle on the full surface of a lab proof print. |
| Opacity | In accordance with German Industrial Standard (DIN) 53,146 |

Physical characteristics of products:

| | Experimental product: | | | |
|---|---|---|---|---|
| Fineness Features: | EP 1 | EP 2 | EP 3 | EP 4 |
| Fraction under 2 $\mu$m | 99 | 100 | 100 | 100 |
| Fraction under 1 $\mu$m | 91 | 98 | 98 | 97 |
| Fraction under 0.5 $\mu$m | 64 | 90 | 85 | 83 |
| Fraction under 0.2 $\mu$m | 34 | 47 | 43 | 41 |
| Mean particle size D50, $\mu$m | 0.40 | 0.21 | 0.25 | 0.24 |
| Specific surface area, BET, m$^2$/g | 21.8 | 21.0 | 22.5 | 22.7 |

Test results:

| | | | | |
|---|---|---|---|---|
| Paper gloss | 39 | 55 | 51 | 65 |
| Printing gloss | 55 | 58 | 57 | 61 |
| Paper white, R-457 | 73.7 | 72.9 | 74.5 | 74.4 |
| Opacity at 56 g/m$^2$ | 85.1 | 88.1 | 86.4 | 86.8 |

The calcium carbonate (EP 4) employed in this example led to the best results by far for gloss and printing gloss in comparison with the tested control products. Although an average man in the art would have expected that EP 2, the commercially available kaolin product with its micellar structure, would inherently produce the best gloss, it in fact failed to reach the outstanding gloss of EP 4. EP 3 in the test having practically the same particle size distribution curve as EP 4 and a specific surface area of 22.5 m$^2$/g was surprisingly poorer, something which in view of the practically identical product parameters can only be attributed to the fact that for the production of EP 3 dispersing and wetting agents were utilized, this leading to particles being present on the surface and therefore to there being a poorer gloss. However it is still better than the control EP 1.

The great differences in gloss between the tested experimental products were completely unexpected for the man in the art, though all tested products possessed practically the same specific surface area, namely 21.0 m$^2$/g to 22.7 m$^2$/g.

The products in accordance with the invention surprising lead to higher gloss values than products in accordance with the prior art. Despite the low solids content the coating color of the invention possesses a substantially better gloss and better print gloss values than the prior art.

The coating color of the invention may with advantage be employed for coated papers, especially for high quality gloss papers and for board coatings.

We claim:

1. A coating color composition comprising:
   28–51% by weight of water;
   43–64% by weight of carbonate-containing pigment with a particle size distribution of
   100% <2 $\mu$m
   94–100% <1 $\mu$m
   75–94% <0.5 $\mu$m
   31–59% <0.2 $\mu$m
   with a mean statistical particle diameter (D$_{50}$) of 0.18–0.28 $\mu$m and with a specific surface area of 19–26 m$^2$/g (as determined by BET; N$_2$; DIN 66,131); and
   6–8% by weight of binding agents and additives.

2. The coating color composition as claimed in claim 1, in which said carbonate-containing pigment is CaCO$_3$.

3. The coating color composition as claimed in claim 1, comprising:
   29–49% by weight of water;
   45–63% by weight of carbonate-containing pigment; and
   6–8% by weight of binding agents and additives.

4. The coating color composition as claimed in claim 1, comprising:

31–48% by weight of water;

45–62% by weight of carbonate-containing pigment; and

7% by weight of binding agents and additives.

5. The coating color composition as claimed in claim 1 in which the carbonate-containing pigment has a particle size distribution of:

100% <2 μm

95–99% <1 μm

80–91% <0.5 μm

35–51% <0.2 μm.

6. The coating color composition as claimed in claim 1 in which the carbonate-containing pigment has a particle size distribution of:

100% <2 μm

95–99% <1 μm

80–91% <0.5 μm

38–51% <0.2 μm.

7. The coating color composition as claimed in claim 1, in which the carbonate-containing pigment has a particle size distribution of:

100% <2 μm

96–98% <1 μm

77–89% <0.5 μm

40–47% <0.2 μm.

8. The coating color composition as claimed in claim 1, in which the carbonate-containing pigment possesses a mean statistical particle diameter ($D_{50}$) of 0.20–0.28 μm.

9. The coating color composition as claimed in claim 1, in which the carbonate-containing pigment possesses a mean statistical particle diameter ($D_{50}$) of 0.22–0.27 μm.

10. The coating color composition as claimed in claim 1, in which the carbonate-containing pigment has a specific surface area of 20 to 25 $m^2/g$.

11. The coating color composition as claimed in claim 1, in which the carbonate-containing pigment has a specific surface area of 21 to 24 $m^2/g$.

12. A method for the production of a coating color, comprising:

(a) without the addition of dispersing or wetting agents, wet milling the carbonate-containing pigment at a solids concentration of 20–30%, in an agitating ball mill with recirculation, to a final fineness of 100% of particles <2 μm 94–100% of particles <1 μm 75–94% of particles <0.5 μm 31–59% of particles <0.2 μm a mean statistical particle diameter ($D_{50}$) of 0.18–0.28 μm and a specific surface area of 19–26 $m^2/g$;

(b) concentrating the carbonate pigment suspension obtained in (a) to a solids content of 63–65% by weight and re-dispersing the concentrated suspension with a dispersant; and (c) mixing the coating color with binding agents, water and additives.

13. The method as claimed in claim 12, in which said solids concentration is 21–26% by weight.

14. A method for applying color to a coated paper, comprising applying to said paper a coating color composition as claimed in claim 1.

15. A method for applying color to a high quality gloss paper, comprising applying to said paper a coating color composition as claimed in claim 1.

16. A method for applying color to a board paper, comprising applying to said paper a coating color composition as claimed in claim 1.

* * * * *